(12) United States Patent
Hwang et al.

(10) Patent No.: US 9,417,427 B2
(45) Date of Patent: Aug. 16, 2016

(54) ZOOM LENS

(71) Applicants: SINTAI OPTICAL (SHENZHEN) CO., LTD., Shenzhen (CN); ASIA OPTICAL INTERNATIONAL LTD., Tortola (GB)

(72) Inventors: Duen-Kwei Hwang, Taichung (TW); Ming-Chih Chang, Taichung (TW)

(73) Assignees: SINTAI OPTICAL (SHENZHEN) CO., LTD., Shenzhen (CN); ASIA OPTICAL INTERNATIONAL LTD., Tortola (GB)

( * ) Notice: Subject to any disclaimer, the term of this patent is extended or adjusted under 35 U.S.C. 154(b) by 0 days.

(21) Appl. No.: 14/586,265

(22) Filed: Dec. 30, 2014

(65) Prior Publication Data

US 2015/0192755 A1     Jul. 9, 2015

(30) Foreign Application Priority Data

Jan. 6, 2014    (TW) .............................. 103100434 A

(51) Int. Cl.
    *G02B 15/14*     (2006.01)
    *G02B 7/10*     (2006.01)
    *G02B 13/00*     (2006.01)

(52) U.S. Cl.
    CPC ................ *G02B 7/10* (2013.01); *G02B 13/009* (2013.01); *G02B 15/14* (2013.01)

(58) Field of Classification Search
    CPC .................................. G02B 7/10; G02B 15/14
    USPC .......................................... 359/676, 703, 704
    See application file for complete search history.

(56) References Cited

U.S. PATENT DOCUMENTS

2007/0047106 A1*    3/2007    Wu .......................... G02B 7/14
                                                                                      359/811

* cited by examiner

*Primary Examiner* — William Choi
(74) *Attorney, Agent, or Firm* — Ming Chow; Sinorica, LLC

(57) ABSTRACT

A zoom lens includes a driving device, a zooming frame, and a lens group, wherein the driving device has a lens barrel. The zooming frame is located in the lens barrel, and has a body, a first lens holder, and a second lens holder which are pivotally connected to the body. The body is drivable by the driving device to reciprocally move between a first position and a second position. The first lens holder is respectively pivoted between a third position and a fourth position on the body along with the body being moved between the first position and the second position. The second lens holder is pivoted between a fifth position and a sixth position on the body in the same way. The lens group has a first lens sub-group provided on the first lens holder, and a second lens sub-group provided on the second lens holder.

20 Claims, 12 Drawing Sheets

ZOOM LENS

The current application claims a foreign priority to the patent application of Taiwan No. 103100434 filed on Jan. 6, 2014.

BACKGROUND OF THE INVENTION

1. Technical Field

The present invention relates generally to optical lenses, and more particularly to a zoom lens.

2. Description of Related Art

With the help of recent advances in imaging technology, the size and weight of zoom lenses used in optical image devices, especially in portable ones such as cameras or camcorders, are greatly reduced. And while optical image devices are being made miniature and lightweight, the manufacturers would always try to improve optical performance thereof to provide higher resolution and better contrast. Obviously, miniature and high optical performance are two key design considerations for zoom lenses nowadays.

To achieve the above purpose of making miniature devices, some optical image devices are designed to have a collapsible zoom lens which can be collapsed into an outer case. However, the lenses in mainstream usually include multiple lens groups composed of many (even more than 10) lens elements in order to satisfy the requirement of high optical performance, and therefore such lenses are still too thick even after being collapsed. There is still room for improvement.

BRIEF SUMMARY OF THE INVENTION

In view of the above, the primary objective of the present invention is to provide a zoom lens, which effectively reduces the thickness of the arrangement of the lenses therein when collapsed.

The present invention provides a zoom lens, which includes a driving device, a zooming frame, and a lens group. The driving device has at least one lens barrel. The zooming frame is located in the lens barrel, wherein the zooming frame has a body, a first lens holder, and a second lens holder which are pivotally connected to the body; the body is drivable by the driving device to reciprocally move between a first position and a second position; the first lens holder is pivoted between a third position and a fourth position on the body along with the body being reciprocally moved between the first position and the second position. The lens group has a first lens sub-group and a second lens sub-group, wherein the first lens sub-group is provided on the first lens holder, and the second lens sub-group is provided on the second lens holder.

The present invention also provides a zoom lens, which includes a driving device, a zooming frame, and a lens group. The driving device has at least a lens barrel. The zooming frame is located in the lens barrel, wherein the zooming frame has a body and a lens holder pivotally connected to the body; the body is drivable by the driving device to reciprocally move between a first position and a second position in the lens barrel; the lens holder is pivoted between a third position and a fourth position on the body along with the body being reciprocally moved between the first position and the second position. The lens group has a first lens sub-group and a second lens sub-group, wherein the first lens sub-group is provided on the body, and the second lens sub-group is provided on the lens holder.

Because the lens sub-groups in the lens group can be respectively pivoted, the thickness of the arrangement of the lenses in the zoom lens can be effectively reduced, and therefore the purpose of providing miniature optical image devices can be achieved.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
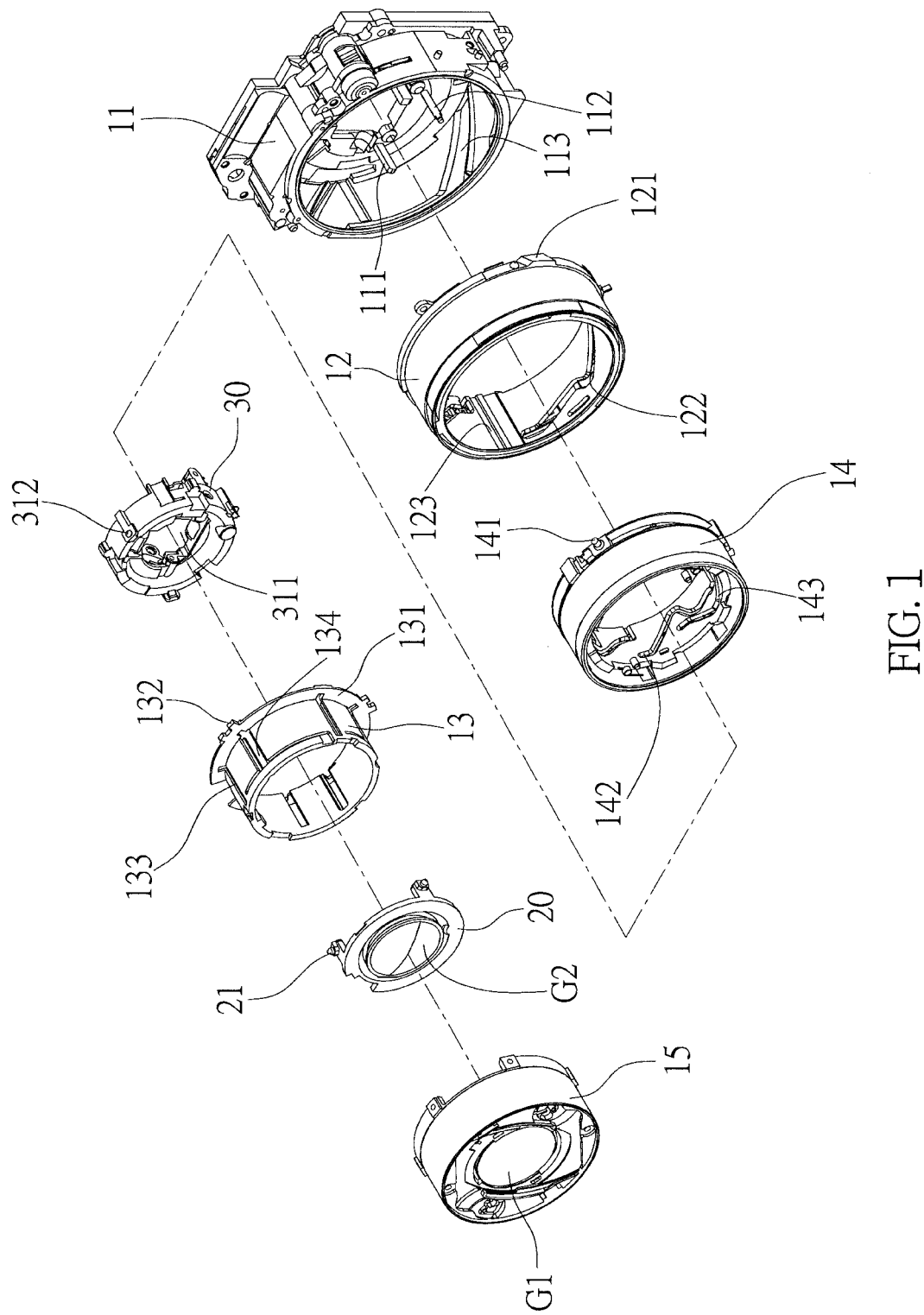
FIG. 1 is an exploded view of a first preferred embodiment of the present invention.
Figure 2:
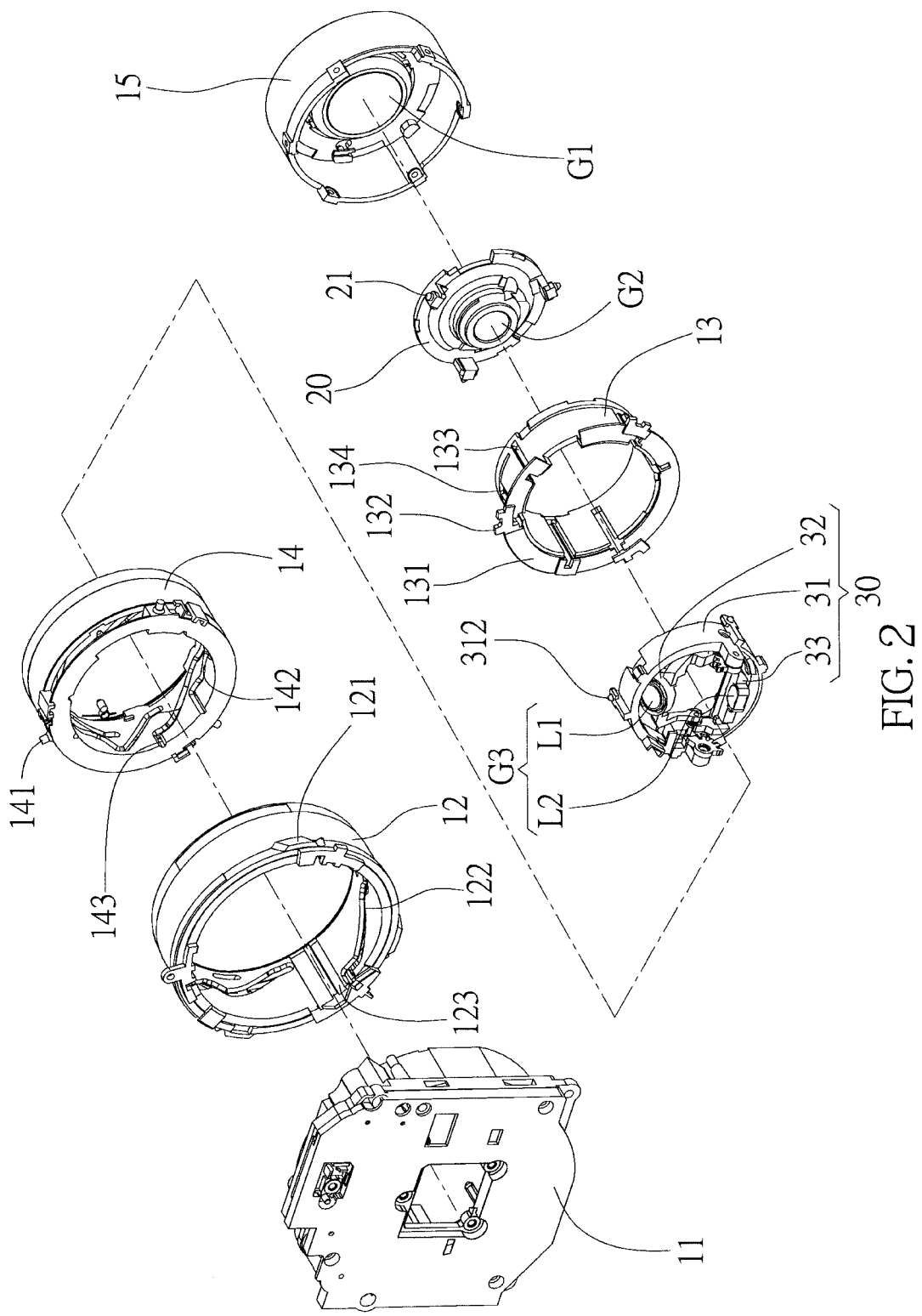
FIG. 2 is an exploded view of the first preferred embodiment seen from another view angle.

As shown in FIG. 1 to FIG. 6, a zoom lens of the first preferred embodiment of the present invention includes a driving device, a first zooming frame 20, a second zooming frame 30, a first lens group G1, a second lens group G2, and a third lens group G3.

The driving device includes a first lens barrel 11, a second lens barrel 12, a third lens barrel 13, a fourth lens barrel 14, and a fifth lens barrel 15. In the first preferred embodiment, the first lens barrel 11 is a stationary cylinder having a first rod 111 and a second rod 112 therein, and there are three guide rails 113 separately provided on an inner wall of the first lens barrel 11. The second lens barrel 12 is a rotary cylinder in the first preferred embodiment, wherein the second lens barrel 12 has three protrusions 121 separately provided on an outer wall thereof, and is positioned in the first lens barrel 11 with the three protrusions 121 respectively received in the guide rails 113 of the first lens barrel. The second lens barrel 12 can be driven by a motor (not shown) to rotate reciprocally in the first lens barrel 11 along the guide rails 113. In addition, the second lens barrel 12 has three first sinuate grooves 122 and three straight grooves 123 separately provided on an inner wall thereof. In the first preferred embodiment, the third lens barrel 13 is a straight barrel provided in the second lens barrel 12, wherein the third lens barrel 13 has a flange 131 at an end thereof, and three separate protrusions 132 respectively received in the straight grooves 123 of the second lens barrel 12; therefore the third lens barrel 13 can be moved reciprocally in the second lens barrel 12 along the straight grooves 123. In addition, the third lens barrel 13 has three first straight openings 133 and three second straight openings 134 separately provided on a wall thereof. The fourth lens barrel 14 is also a straight barrel in the first preferred embodiment, and it is located in the second lens barrel 12 between the second lens barrel 12 and the third lens barrel 13. The fourth lens barrel 14 has three first shafts 141 separately provided on an outer wall thereof, wherein the three first shafts 141 are respectively received in the first sinuate grooves 122 of the second lens barrel 12. Whereby, the fourth lens barrel 14 can be moved reciprocally in the second lens barrel 12 along the first sinuate grooves 122. In addition, the fourth lens barrel 14 has three second sinuate grooves 142 and three third sinuate grooves 143 separately provided on an inner wall thereof. The fifth lens barrel 15 is fitted in the fourth lens barrel 14, and can be moved relative to the fourth lens barrel 14.

The first zooming frame 20 is provided in the third lens barrel 13, and has three second shafts 21 separately provided on an outer wall thereof, wherein the second shafts 21 are respectively received in the second sinuate grooves 142 of the fourth lens barrel 14 through the first straight openings 133 of the third lens barrel 13. Whereby, the first zooming frame 20 can be driven along with the fourth lens barrel 14, and therefore can be moved reciprocally in the third lens barrel 13 along the first straight openings 133 and the second sinuate grooves 142.

Figure 7:
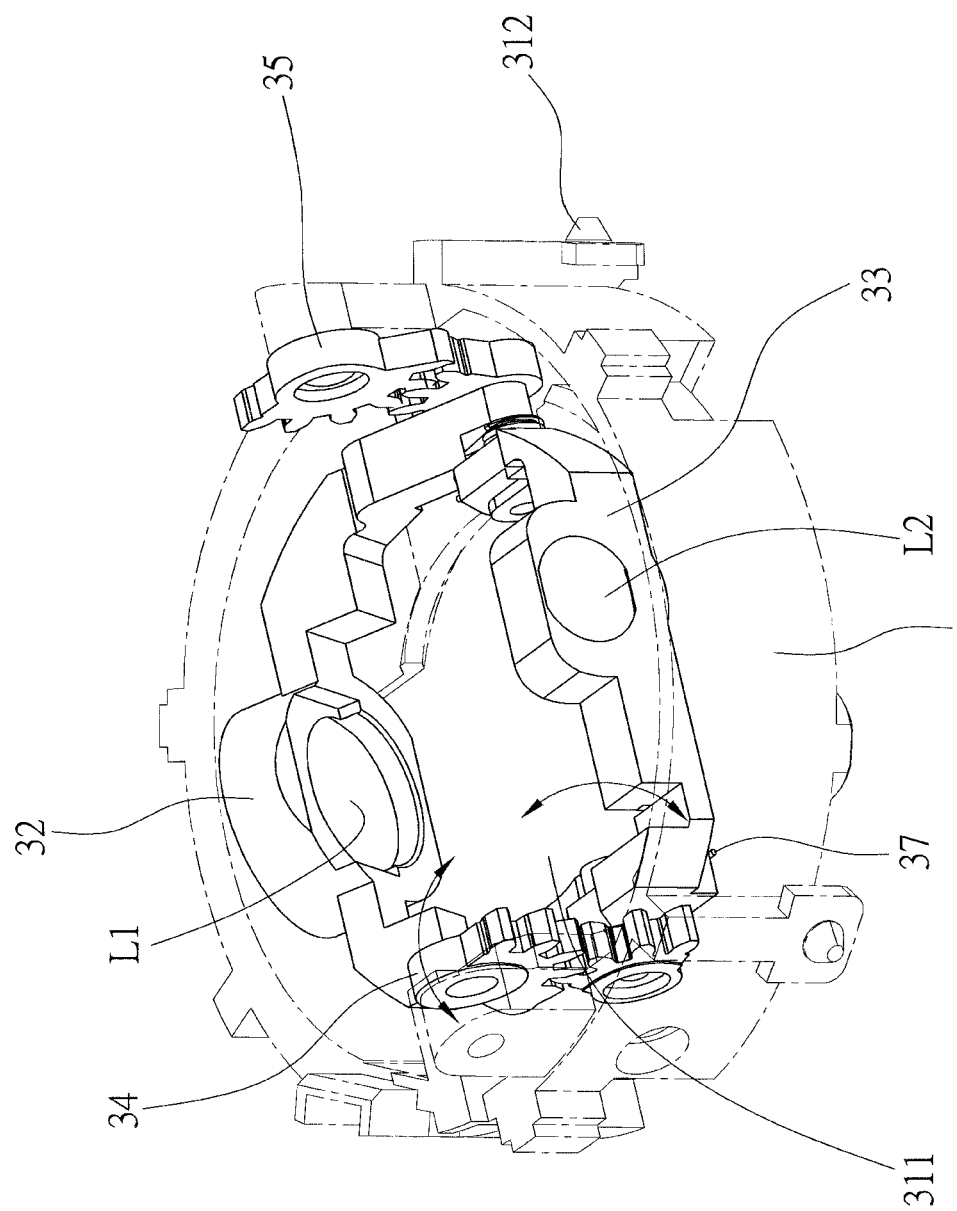
FIG. 7 is a schematic diagram showing the second zooming frame at the first position.
Figure 8:
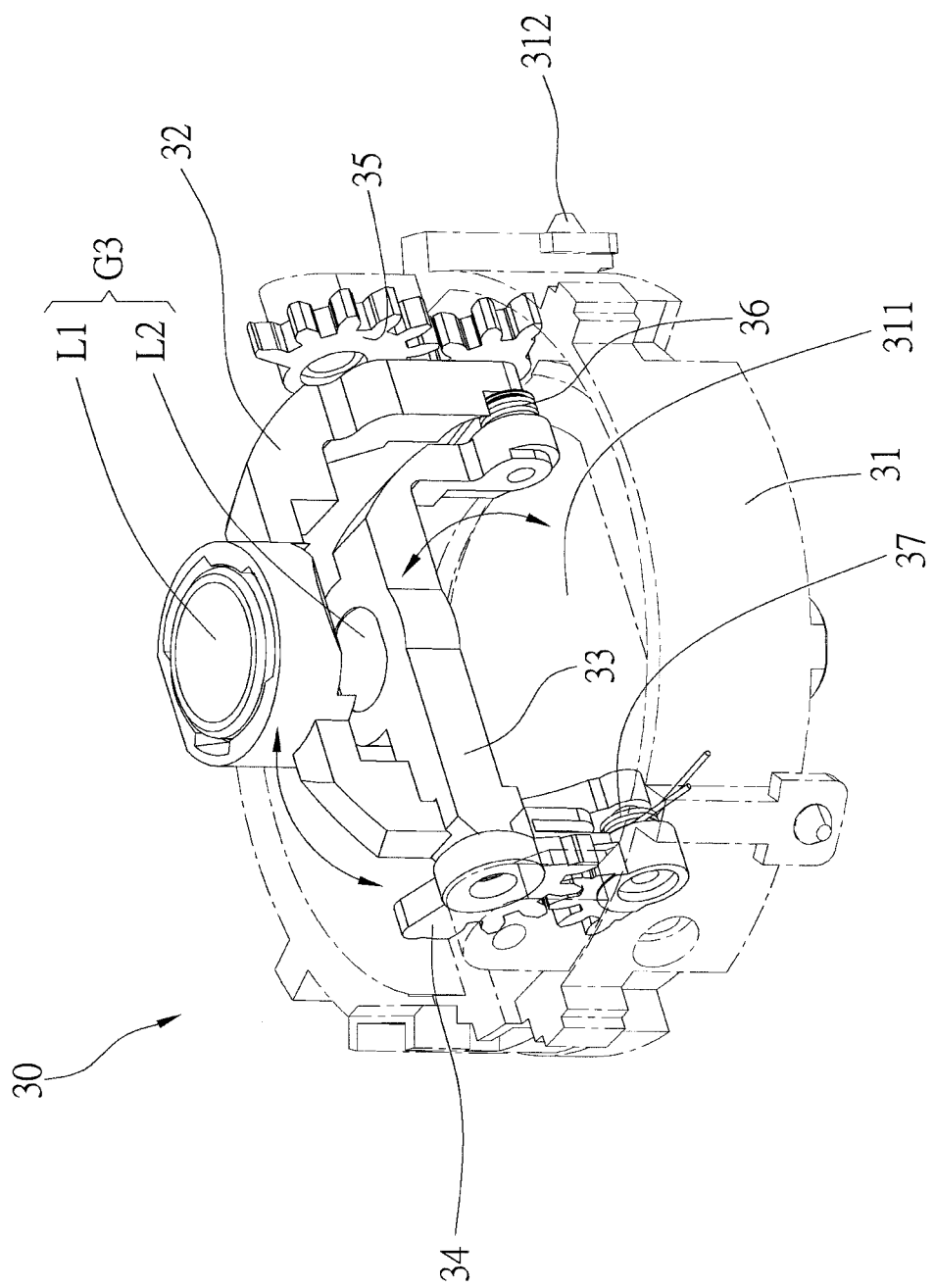
FIG. 8 is a schematic diagram showing the second zooming frame at the second position.

The second zooming frame 30 is also provided in the third lens barrel 13, and, as shown in FIG. 7 and FIG. 8, includes a body 31, a first lens holder 32, a second lens holder 33, a first gear train 34, a second gear train 35, a first torsion spring 36 and a second torsion spring 37.

The body 31 has a hole 311 at a center thereof, and three third shafts 312 separately provided on an outer wall of the body 31, wherein the third shafts 312 are respectively received in the third sinuate grooves 143 of the fourth lens barrel 14 through the second straight openings 134 of the third lens barrel 13. Whereby, when the second lens barrel 12 is rotated by the motor and consequently brings the fourth lens barrel 14 to rotate, the body 31 is brought by the fourth lens barrel 14 to move reciprocally along the second straight openings 134 and the third sinuate grooves 143 between a first position (as FIG. 4) and a second position (as FIG. 6) in the third lens barrel 13.

The first lens holder 32 and a second lens holder 33 are pivotally provided on the body 31. When the body 31 is moved to the first position, the first lens holder 32 is moved to a third position (as FIG. 7) where is away from the hole 311; when the body 31 is moved to the second position, the first lens holder 32 is moved to a fourth position (as FIG. 8) to precisely align with the hole 311. In addition, pivoting directions of the first lens holder 32 and the second lens holder 33 are different, which are opposite in the first preferred embodiment.

The second gear train 35 is located at where the first lens holder 32 pivotally connected to the body 31, and connected to the first lens holder 32. The first gear train 34 is located at where the second lens holder 33 pivotally connected to the body 31, and is connected to the second lens holder 33. The first torsion spring 36 respectively pushes against the body 31 and the first lens holder 32 with two opposite ends thereof, and therefore the first lens holder 32 is exerted by a force from the third position toward the fourth position. Similarly, the second torsion spring 37 respectively pushes against the body 31 and the second lens holder 33 with two opposite ends thereof, and therefore the second lens holder 33 is exerted by a force from a the fifth position toward a the sixth position.

The first lens group G1 is fixed on the fifth lens barrel 15, and can be moved along with the fifth lens barrel 15. The second lens group G2 is fixed on the first zooming frame 20, and can be moved along with the first zooming frame 20. The third lens group G3 is provided on the second zooming frame 30, wherein the third lens group G3 has a first lens sub-group L1 and a second lens sub-group. The first lens sub-group L1 is provided on the first lens holder 32, while the second lens sub-group L2 is provided on the second lens holder 33.

Figure 3:
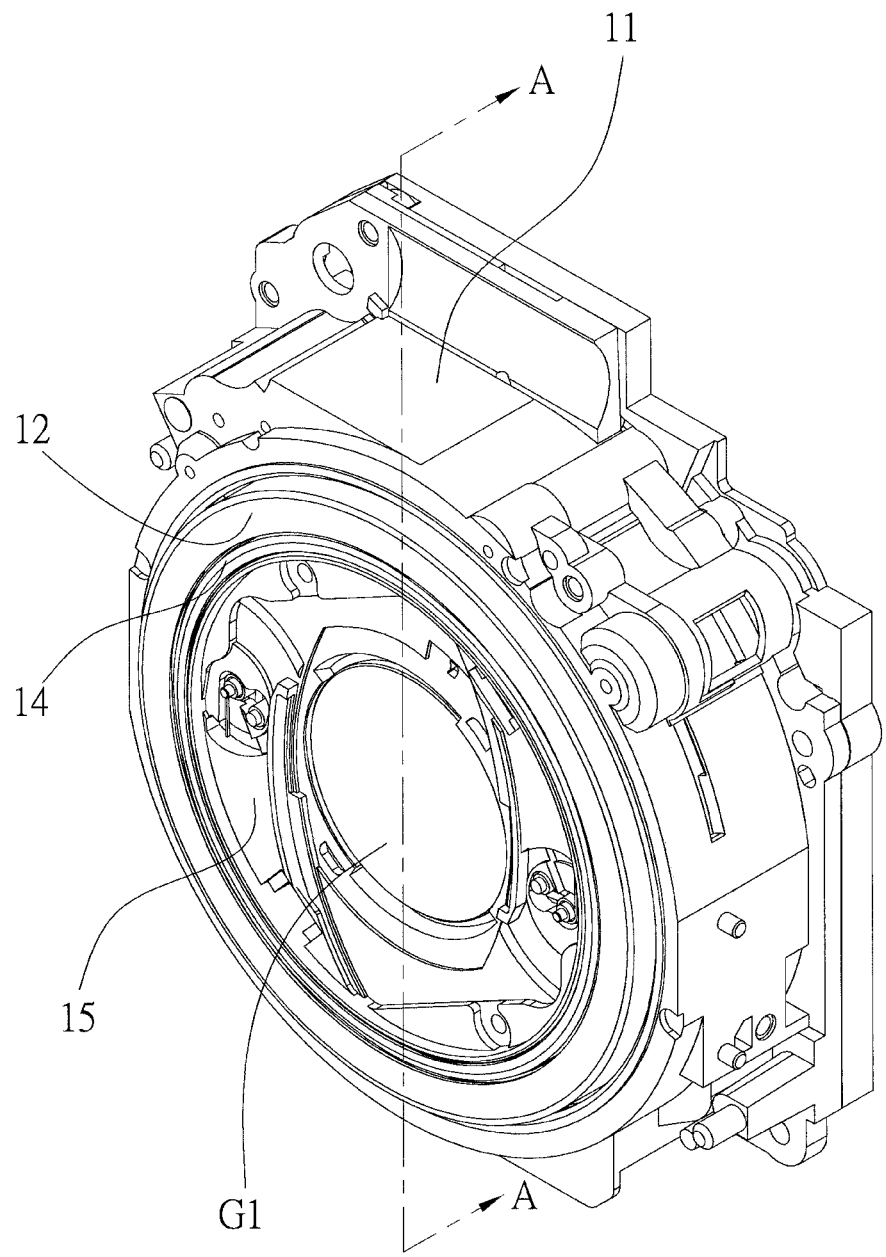
FIG. 3 is a schematic diagram showing the zoom lens in the collapsed state.
Figure 4:
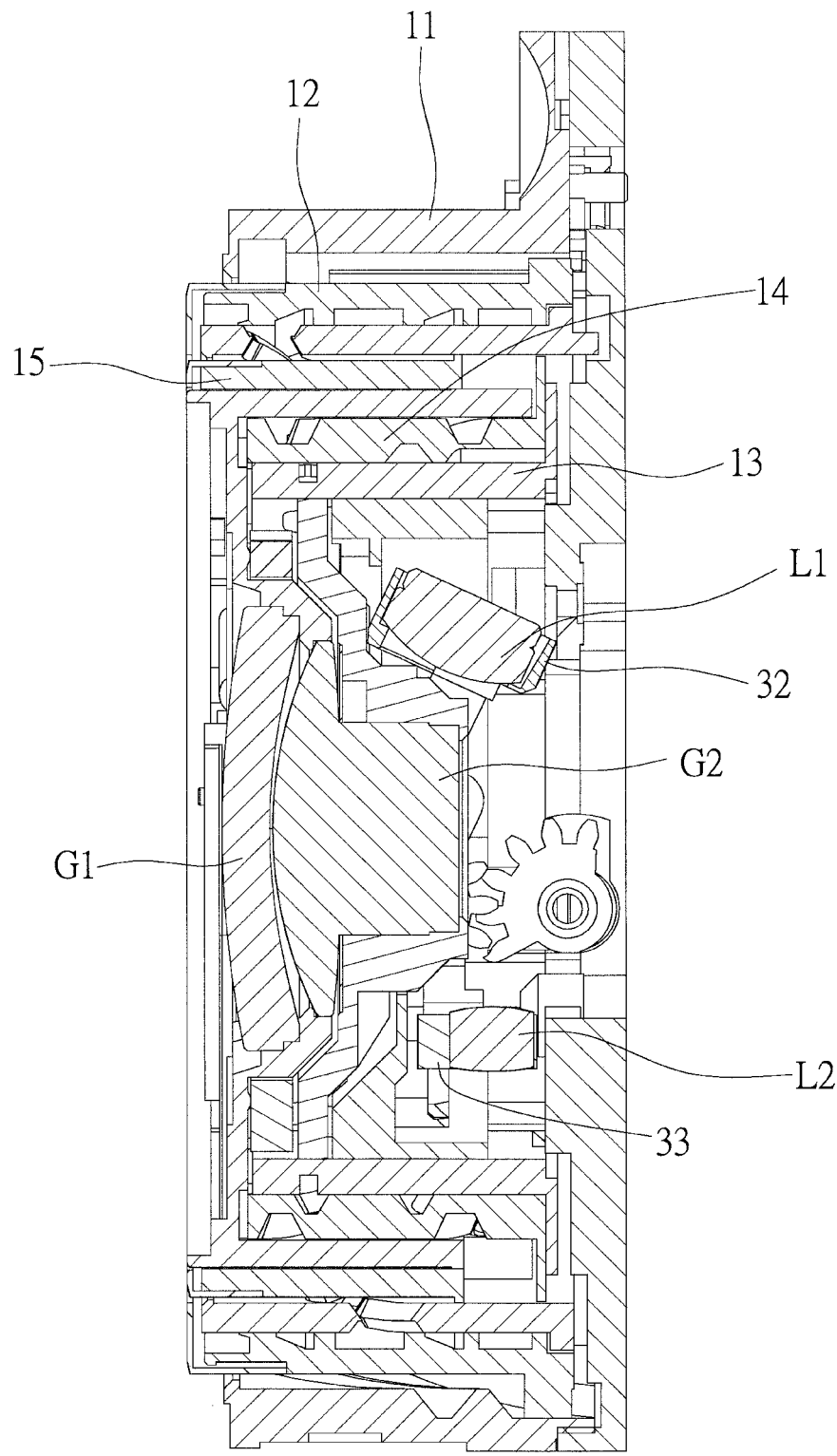
FIG. 4 is a sectional view along the line A-A in FIG. 3.
Figure 5:
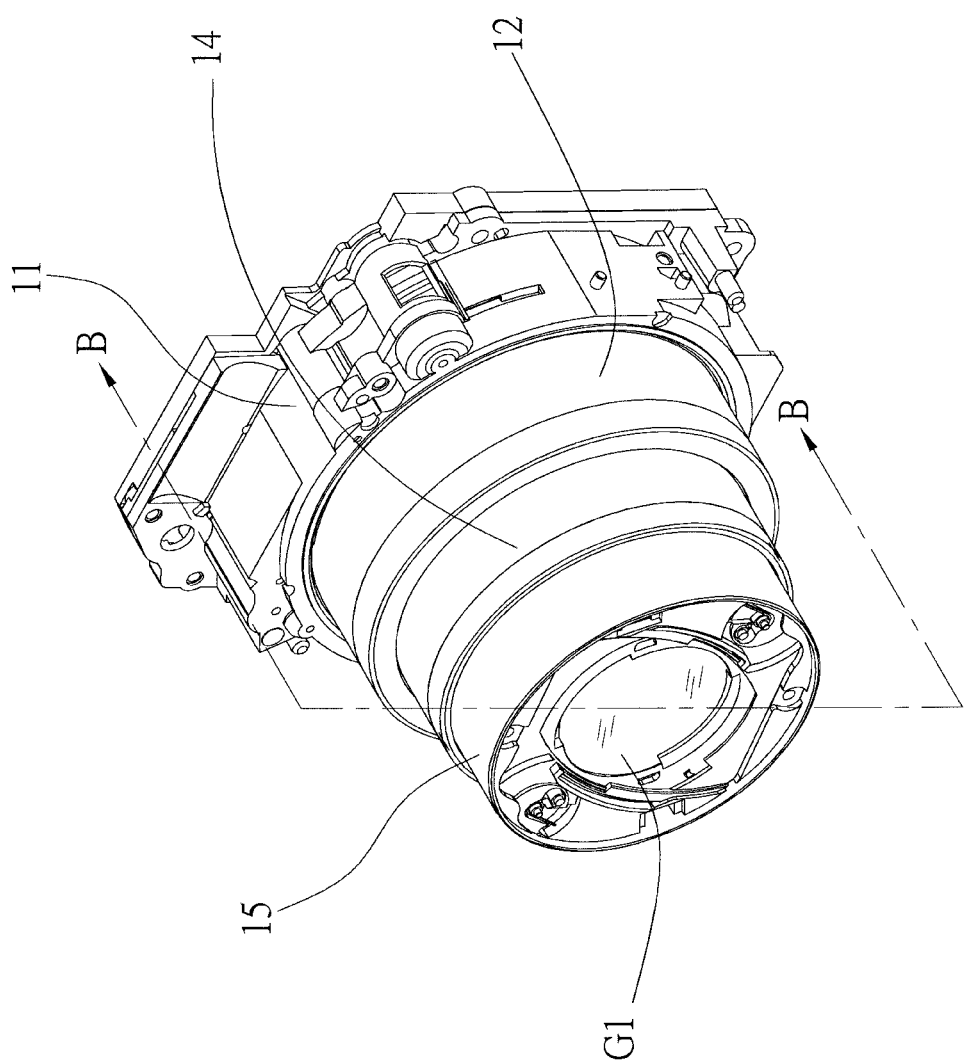
FIG. 5 is a schematic diagram showing the zoom lens in the extended state.
Figure 6:
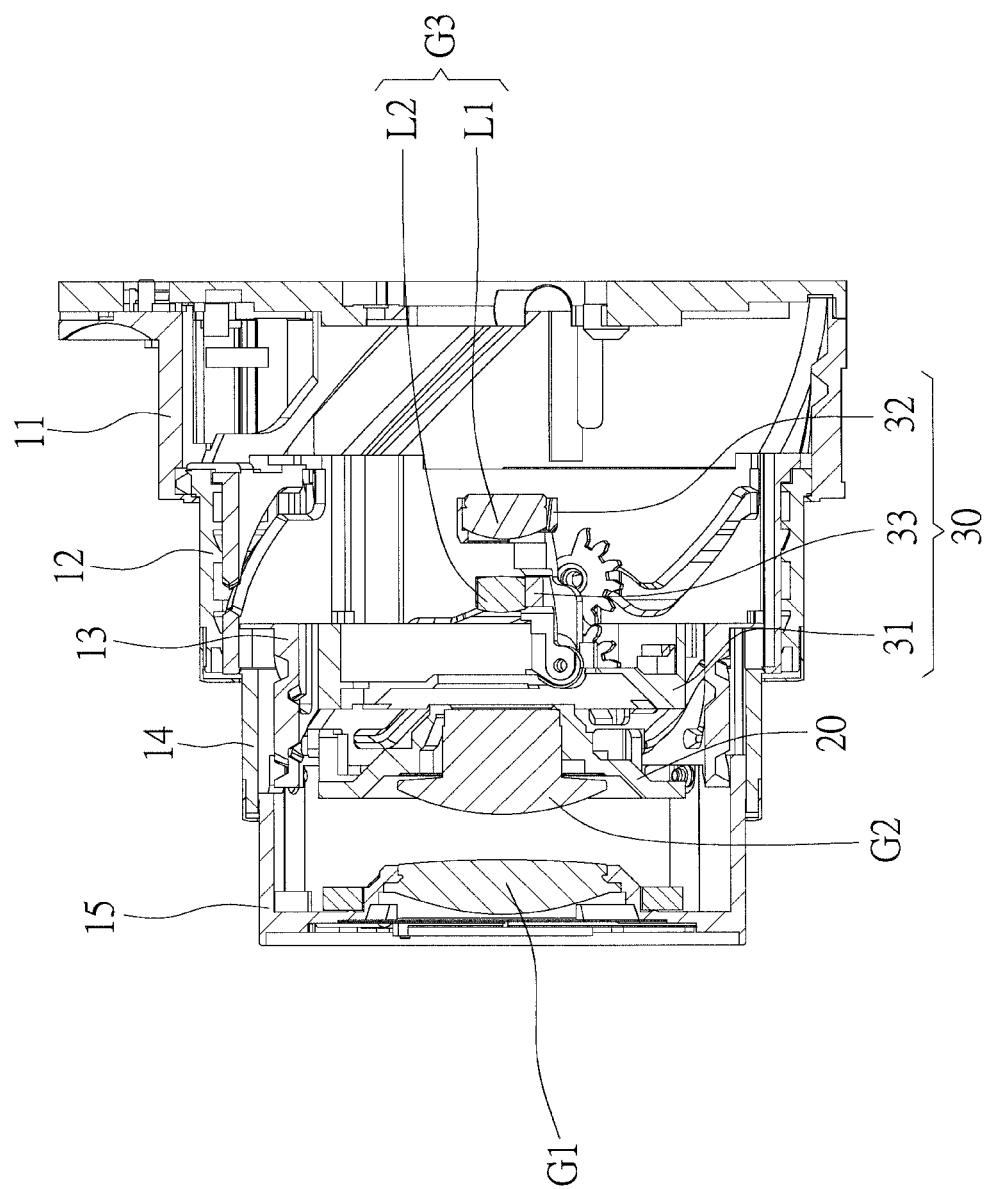
FIG. 6 is a sectional view along the line B-B in FIG. 5.

Whereby, when the second lens barrel 12 is driven to rotate by the motor, the second lens barrel 12 is moved along the guide rails 113. Consequently, the fourth lens barrel 14 is moved along the first sinuate groove 122, and therefore the fifth lens barrel 15 is moved toward or away from the first lens barrel 11. In more details, the first zooming frame 20 is guided by the second sinuate grooves 142 and therefore moved along the first straight holes 133, while the body 31 of the second zooming frame 30 is guided by the second straight holes 134 and therefore reciprocally moved between the first position and the second position. As a result, the zoom lens is able to transit between a collapsed state (as shown in FIG. 3) and an extended state (as shown in FIG. 5).

In this way, when the zoom lens transits from the collapsed state (as FIG. 3 and FIG. 4) to the extended state (as FIG. 5 and FIG. 6), the body 31 of the second zooming frame 30 is moved from the first position toward the second position. At this time, the first lens holder 32 is exerted by the force of the first torsion spring 36, and therefore pivoted from the third position toward the fourth position; the second lens holder 33 is exerted by the force of the second torsion spring 37, and therefore pivoted from the fifth position toward the sixth position. Consequently, the first lens sub-group L1 and the second lens sub-group L2 of the third lens group G3 precisely align with the hole 311, and therefore the third lens group G3, the second lens group G2, and the first lens group G1 are arranged in a straight line. After that, a focal length of the zoom lens can be adjusted by respectively moving the first zooming frame 20 and the second zooming frame 30 in the third lens barrel 13.

Figure 9:
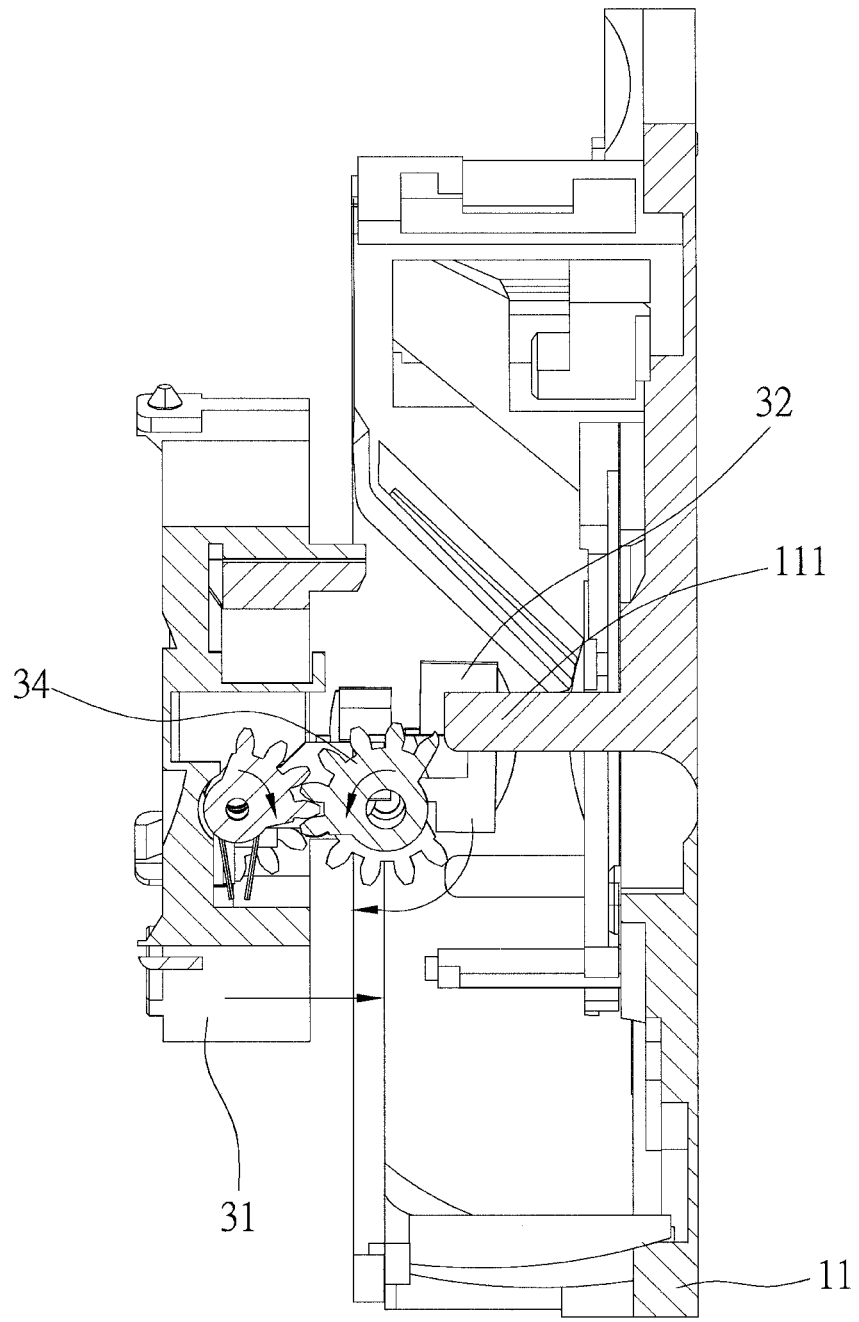
FIG. 9 is a schematic diagram showing the motion of the first lens holder of the second zooming frame while the zoom lens is transiting from the extended state to the collapsed state.
Figure 10:
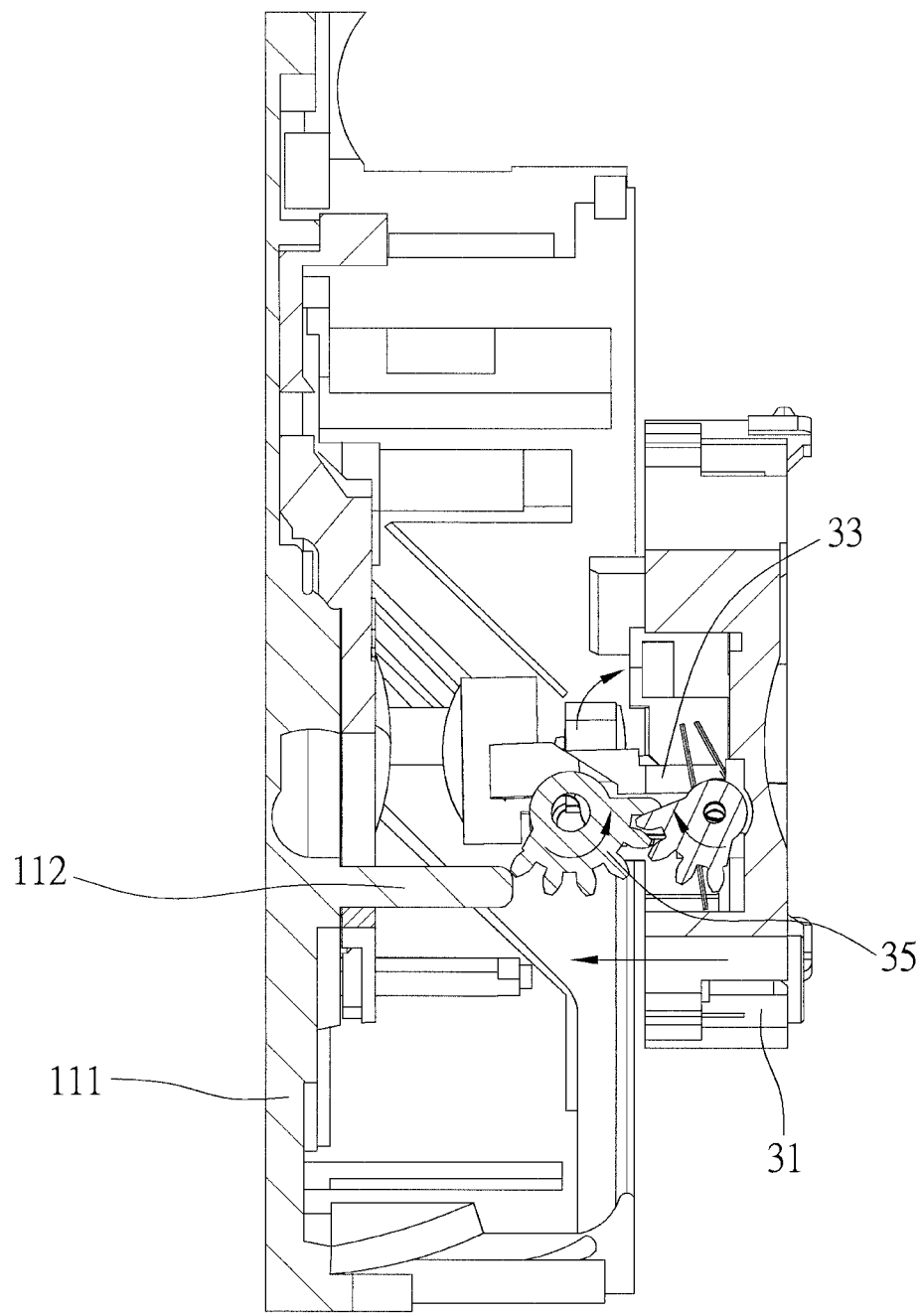
FIG. 10 is a schematic diagram showing the motion of the second lens holder of the second zooming frame while the zoom lens is transiting from the extended state to the collapsed state.

On the contrary, when the zoom lens transits from the extended state (as FIG. 5 and FIG. 6) to the collapsed state (as FIG. 3 and FIG. 4), the body 31 of the second zooming frame 30 is driven to gradually move from the second position toward the first position. At this time, as shown in FIG. 9, the first rod 111 of the first lens barrel 11 pushes and turns the first gear train 34 to pivot the second lens holder 33 from the sixth position back to the fifth position. The second lens holder 33 then stays at the fifth position because the first rod 111 presses against the first gear train 34 to prevent it from turning backwardly. On the other side, as shown in FIG. 10, the second rod 112 of the first lens barrel 11 pushes and turns the second gear train 35 to pivot the first lens holder 32 from the fourth position back to the third position. The first lens holder 32 then stays at the third position because the second rod 112 presses against the second gear train 35 to prevent it from turning backwardly.

With the aforementioned design, when the zoom lens is at the collapsed state, the lens sub-groups L1, L2 of the third lens group G3 are staggered by pivoting the first lens holder 32 and the second lens holder 33, which effectively reduces a thickness of the zoom lens.

Figure 11:
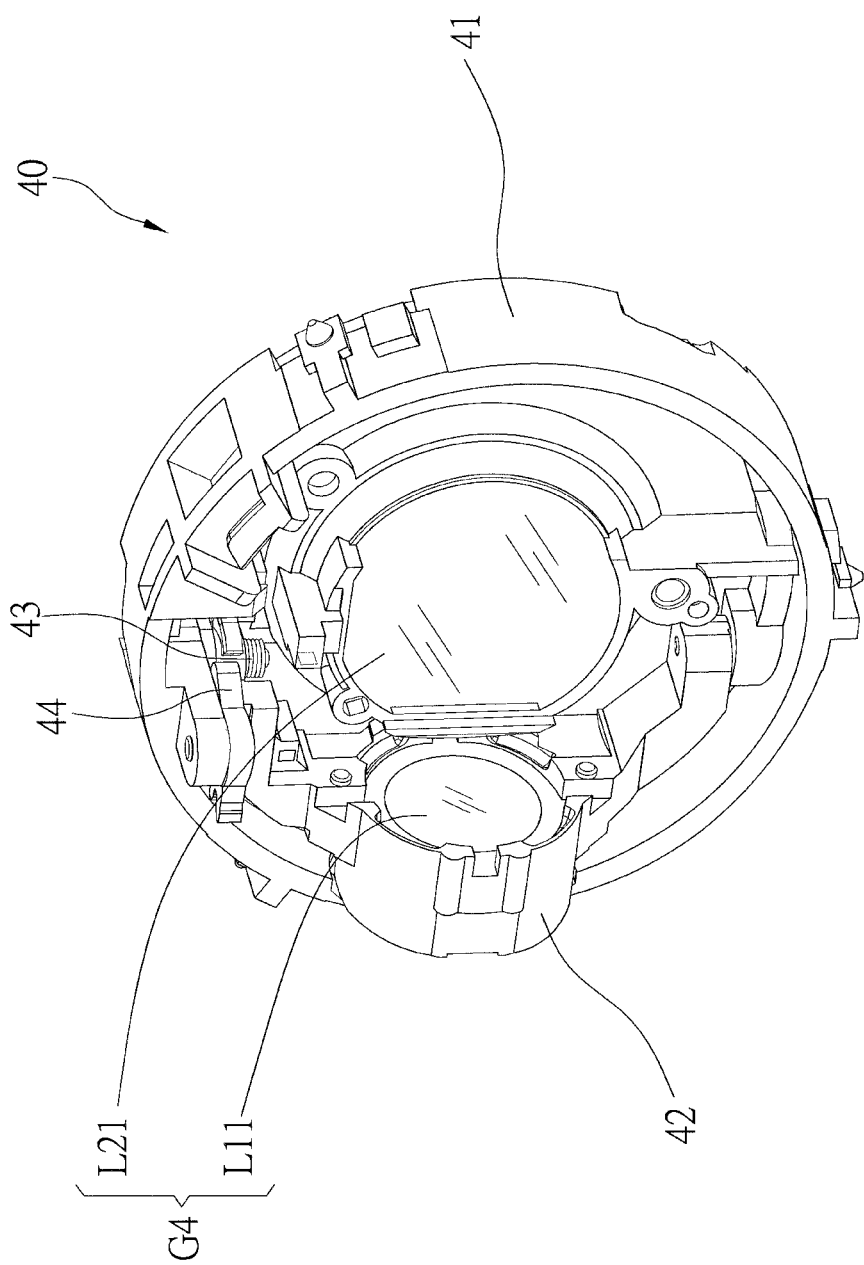
FIG. 11 is a schematic diagram showing the zooming frame of a second preferred embodiment at the first position.
Figure 12:
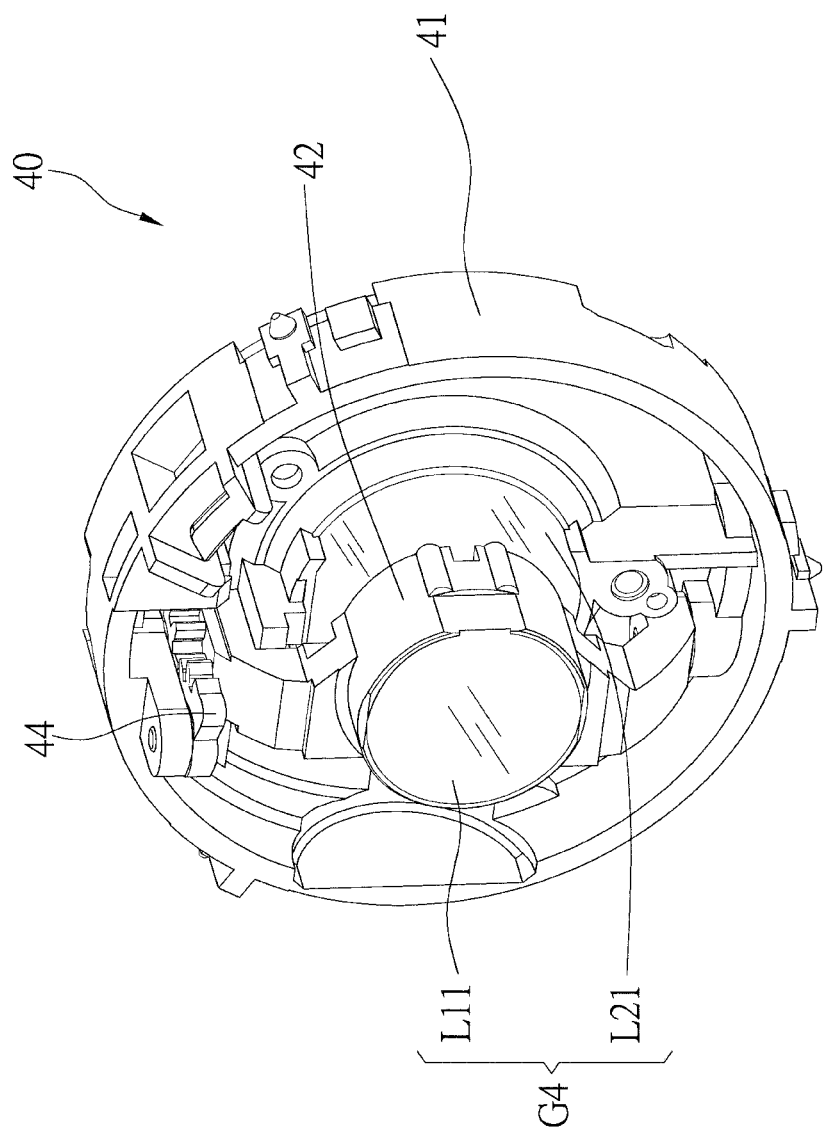
FIG. 12 is a schematic diagram showing the zooming frame of the second preferred embodiment at the second position.

In addition, if the third lens group G3 includes more lenses, some lenses can be divided into a third lens sub-group to be located in the hole 311 of the body 31, and the thickness of the zoom lens can be still reduced in this way. Furthermore, as shown in FIG. 11 and FIG. 12, an alternative zooming frame 40 included in a zoom lens of the second preferred embodiment of the present invention has a body 41, a lens holder 42, a torsion spring 43, and a gear train 44, wherein the lens group G4 is divided into a first lens sub-group L11 and a second lens sub-group L21 respectively provided on the lens holder 42 and a hole 411 of the body 41. Whereby, when the body 41 is moved between the first position and the second position, the torsion spring 43 and the gear train 44 brings the lens holder 42 to pivot between a third position (as shown in FIG. 11) and a fourth position (as shown in FIG. 12). Thus, the lens sub-groups L11, L21 are staggered when the zoom lens is at the collapsed state, and therefore the thickness of the zoom lens is reduced as well.

It must be pointed out that the embodiments described above are only some preferred embodiments of the present invention. All equivalent structures which employ the concepts disclosed in this specification and the appended claims should fall within the scope of the present invention.

What is claimed is:

1. A zoom lens, comprising:
a driving device having at least one lens barrel;
a zooming frame located in the lens barrel, wherein the zooming frame has a body, a first lens holder, and a second lens holder which are pivotally connected to the body; the body is drivable by the driving device to be reciprocally moved between a first position and a second position; the first lens holder is pivoted between a third position and a fourth position on the body along with the body being reciprocally moved between the first position and the second position; and
a lens group having a first lens sub-group and a second lens sub-group, wherein the first lens sub-group is provided on the first lens holder, and the second lens sub-group is provided on the second lens holder.

2. The zoom lens of claim 1, wherein the body of the zooming frame has a hole thereon; when the first lens holder is at the third position, the first lens sub-group is away from the hole; when the first lens holder is at the fourth position, the first lens sub-group precisely aligns with the hole.

3. The zoom lens of claim 1, further comprising a torsion spring, which respectively pushes against the body and the first lens holder with two opposite ends thereof, wherein the first lens holder is therefore exerted by a force to pivot from the third position toward the fourth position.

4. The zoom lens of claim 1, wherein the driving device further has a rod; the zooming frame has a gear train provided at where the first lens holder pivotally connected to the body; when the body of the zooming frame is moved from the second position to the first position, the rod pushes and turns the gear train to pivot the first lens holder from the fourth position back to the third position, and the first lens holder then stays at the third position.

5. The zoom lens of claim 1, wherein the driving device includes a first lens barrel, a second lens barrel, a third lens barrel, a fourth lens barrel, and a fifth lens barrel; the second lens barrel is provided in the first lens barrel, and is rotatable in the first lens barrel; the third lens barrel is provided in the second lens barrel, and is reciprocally movable in the second lens barrel; the fourth lens barrel is provided in the second lens barrel between the second lens barrel and the third lens barrel, and is reciprocally movable in the second lens barrel; the fifth lens barrel is provided in the fourth lens barrel, and is movable relative to the fourth lens barrel; the zooming frame is provided in the third lens barrel; the body of the zooming frame is reciprocally moved between the first position and the second position along with the second lens barrel being rotated.

6. The zoom lens of claim 5, further comprising another zooming frame provided in the third lens barrel, wherein the another zooming frame is drivable by the fourth lens barrel to be reciprocally moved in the third lens barrel.

7. The zoom lens of claim 1, wherein the second lens holder is pivoted between a fifth position and a sixth position on the body along with the body being reciprocally moved between the first position and the second position.

8. The zoom lens of claim 7, the body of the zooming frame has a hole thereon; when the first lens holder and the second lens holder are respectively at the third position and the fifth position, the first lens sub-group and the second lens sub-group are away from the hole; when the first lens holder and the second lens holder are respectively at the fourth position and the sixth position, the first lens sub-group and the second lens sub-group precisely align with the hole.

9. The zoom lens of claim 8, wherein the lens group further includes a third lens sub-group provided on the body of the zooming frame and at the hole.

10. The zoom lens of claim 7, wherein pivoting directions of the first lens holder and the second lens holder are different.

11. The zoom lens of claim 10, wherein the pivoting directions of the first lens holder and the second lens holder are opposite.

12. The zoom lens of claim 7, further comprising a first torsion spring and a second torsion spring, wherein the first torsion spring respectively pushes against the body and the first lens holder with two opposite ends thereof, and the first lens holder is therefore exerted by a force to pivot from the third position to the fourth position; the second torsion spring respectively pushes against the body and the second lens holder with two opposite ends thereof, and therefore the second lens holder is exerted by a force to pivot from the fifth position to the sixth position.

13. The zoom lens of claim 7, wherein the driving device further has a first rod and a second rod; the zooming frame has a first gear train provided at where the first lens holder pivotally connected to the body, and a second gear train provided at where the second lens holder pivotally connected to the body; when the body of the zooming frame is moved from the second position to the first position, the first rod pushes and turns the first gear train to pivot the first lens holder form the fourth position back to the third position, at where the first lens holder then stays, and the second rod pushes and turns the second gear train to pivot the second lens holder from the sixth position back to the fifth position, at where the second lens holder then stays.

14. The zoom lens of claim 7, wherein the driving device includes a first lens barrel, a second lens barrel, a third lens barrel, a fourth lens barrel, and a fifth lens barrel; the second lens barrel is provided in the first lens barrel, and is rotatable in the first lens barrel; the third lens barrel is provided in the second lens barrel, and is reciprocally movable in the second lens barrel; the fourth lens barrel is provided in the second lens barrel between the second lens barrel and the third lens barrel, and is reciprocally movable in the second lens barrel; the fifth lens barrel is provided in the fourth lens barrel, and is movable relative to the fourth lens barrel; the zooming frame is provided in the third lens barrel; the body of the zooming frame is reciprocally moved between the first position and the second position along with the second lens barrel being rotated.

15. The zoom lens of claim 14, further comprising another zooming frame provided in the third lens barrel, wherein the another zooming frame is drivable by the fourth lens barrel to be reciprocally moved in the third lens barrel.

16. A zoom lens, comprising:
    a driving device having at least a lens barrel;
    a zooming frame located in the lens barrel, wherein the zooming frame has a body and a lens holder pivotally connected to the body;
    the body is drivable by the driving device to reciprocally move between a first position and a second position in the lens barrel;
    the lens holder is pivoted between a third position and a fourth position on the body along with the body being reciprocally moved between the first position and the second position;
    a lens group having a first lens sub-group and a second lens sub-group, wherein the first lens sub-group is provided on the body, and the second lens sub-group is provided on the lens holder; and
    a rod;
    wherein the zooming frame has a gear train provided at where the lens holder is pivotally connected to the body;
    when the body of the zooming frame is moved from the second position to the first position, the rod pushes and turns the gear train to pivot the lens holder from the fourth position back to the third position, and the first lens holder then stays at the third position.

17. The zoom lens of claim 16, wherein the body of the zooming frame has a hole thereon, and the first lens sub-group is located at the hole; when the lens holder is at the third position, the second lens sub-group is away from the hole; when the lens holder is at the fourth position, the second lens sub-group precisely aligns with the hole.

18. The zoom lens of claim 16, further comprising a torsion spring, which respectively pushes against the body and the lens holder with two opposite ends thereof; wherein the lens holder is therefore exerted by a force to pivot from the third position toward the fourth position.

19. The zoom lens of claim 16, wherein the driving device includes a first lens barrel, a second lens barrel, a third lens barrel, a fourth lens barrel, and a fifth lens barrel; the second lens barrel is provided in the first lens barrel, and is rotatable in the first lens barrel; the third lens barrel is provided in the second lens barrel, and is reciprocally movable in the second lens barrel; the fourth lens barrel is provided in the second lens barrel between the second lens barrel and the third lens barrel, and is reciprocally movable in the second lens barrel; the fifth lens barrel is provided in the fourth lens barrel, and is movable relative to the fourth lens barrel; the zooming frame is provided in the third lens barrel; the body of the zooming frame is reciprocally moved between the first position and the second position along with the second lens barrel being rotated.

20. A zoom lens, comprising:
    a driving device having at least a lens barrel;
    a zooming frame located in the lens barrel, wherein the zooming frame has a body and a lens holder pivotally connected to the body;
    the body is drivable by the driving device to reciprocally move between a first position and a second position in the lens barrel;
    the lens holder is pivoted between a third position and a fourth position on the body along with the body being reciprocally moved between the first position and the second position; and
    a lens group having a first lens sub-group and a second lens sub-group, wherein the first lens sub-group is provided on the body, and the second lens sub-group is provided on the lens holder;
    the driving device includes a first lens barrel, a second lens barrel, a third lens barrel, a fourth lens barrel, and a fifth lens barrel;
    the second lens barrel is provided in the first lens barrel, and is rotatable in the first lens barrel;
    the third lens barrel is provided in the second lens barrel, and is reciprocally movable in the second lens barrel;
    the fourth lens barrel is provided in the second lens barrel between the second lens barrel and the third lens barrel, and is reciprocally movable in the second lens barrel;
    the fifth lens barrel is provided in the fourth lens barrel, and is movable relative to the fourth lens barrel;
    the zooming frame is provided in the third lens barrel; and
    the body of the zooming frame is reciprocally moved between the first position and the second position along with the second lens barrel being rotated.

\* \* \* \* \*